US012731281B2

(12) United States Patent
Liu et al.

(10) Patent No.: US 12,731,281 B2
(45) Date of Patent: Sep. 8, 2026

(54) THREE-DIMENSIONAL OBJECT DETECTION METHOD AND DEVICE AND READABLE STORAGE MEDIUM

(71) Applicant: Lenovo (Beijing) Limited, Beijing (CN)

(72) Inventors: Li Liu, Beijing (CN); Xujie Chen, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 361 days.

(21) Appl. No.: 18/588,502

(22) Filed: Feb. 27, 2024

(65) Prior Publication Data

US 2024/0289977 A1 Aug. 29, 2024

(30) Foreign Application Priority Data

Feb. 28, 2023 (CN) ........................ 202310184698.6

(51) Int. Cl.

*G06T 7/70* (2017.01)
*G06T 7/62* (2017.01)
*G06T 7/80* (2017.01)

(52) U.S. Cl.

CPC .................. *G06T 7/70* (2017.01); *G06T 7/62* (2017.01); *G06T 7/80* (2017.01)

(58) Field of Classification Search

CPC ................ G06T 7/70; G06T 7/80; G06T 7/62
See application file for complete search history.

(56) References Cited

U.S. PATENT DOCUMENTS

2018/0307922 A1* 10/2018 Yoon ......................... G06T 7/55
2020/0105017 A1* 4/2020 Gu ........................... G06T 7/80
2021/0150726 A1* 5/2021 Kao ......................... G06T 7/168
2021/0397857 A1* 12/2021 Liu ......................... G06V 20/58
2022/0402433 A1* 12/2022 Li ............................. G06T 7/80
2023/0132646 A1* 5/2023 Ratti ...................... H04N 7/181
348/159

* cited by examiner

*Primary Examiner* — Ming Shui
(74) *Attorney, Agent, or Firm* — ANOVA LAW GROUP, PLLC

(57) ABSTRACT

A three-dimensional object detection method includes: determining first plane coordinates of multiple landing points of a first object based on a projection frame of the 3D first object in a to-be-detected image, the to-be-detected image being captured by an image acquisition device; obtaining first world coordinate information based on a world coordinate system established based on position information and size information of the first object, the first world coordinate information including first world coordinates of the multiple landing points of the first object and first word coordinates of multiple vertices of the first object; and using coordinate conversion processing to obtain external parameter information that converts the world coordinates of the first object into camera coordinate based on the first plane coordinates, the first world coordinates of the multiple landing points of the first object, and the internal parameter information of the image acquisition device.

17 Claims, 5 Drawing Sheets

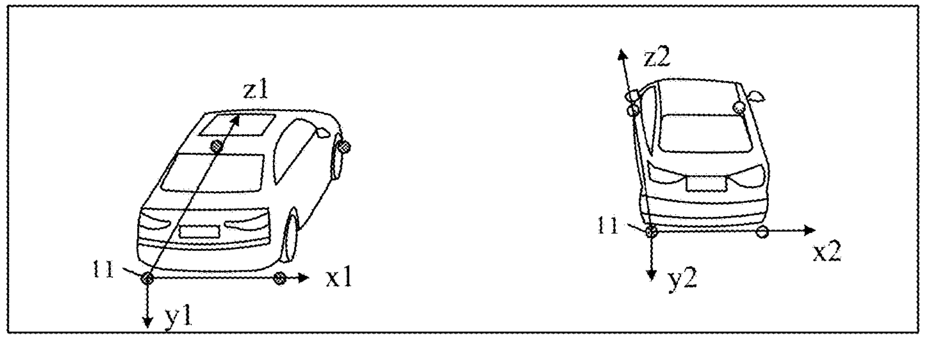

FIG. 1C

Use the coordinate conversion processing to obtain the second world coordinates of multiple landing points of the second object in the world coordinate system of the first object based on the external parameter information, the internal parameter information and the second plane coordinates of multiple landing points of the second object in the to-be-detected image, the size information of the second object being unknown, a distance between the second object and the first object being less than a distance threshold — 210

↓

Use the coordinate conversion processing to determine the height of the second object based on the second plane coordinates of the second object vertex and the second world coordinates of the landing point, the height of the second object being used to determined the second world coordinates of the plurality of vertices of the second object — 220

FIG. 2A

THREE-DIMENSIONAL OBJECT DETECTION METHOD AND DEVICE AND READABLE STORAGE MEDIUM

CROSS-REFERENCES TO RELATED APPLICATION

This application claims priority to Chinese Patent Application No. 202310184698.6 filed on Feb. 28, 2023, the entire content of which is incorporated herein by reference.

FIELD OF TECHNOLOGY

The present disclosure relates to the field of measurement technology and, more specifically, to a three-dimensional (3D) object detection method and device, and computer readable storage medium.

BACKGROUND

Due to its low cost and high resolution, monocular imaging devices are commonly installed on the roadside to monitor vehicles and pedestrians. Monocular imaging devices are indispensable sensing devices for vehicle-road coordination. However, due to the lack of depth information of the monocular imaging devices, the accuracy of using a single monocular imaging device to obtain the camera coordinates of an object is low.

SUMMARY

One aspect of this disclosure provides a 3D object detection method. The 3D object detection method includes determining the first plane coordinates of multiple landing points of a first object based on a projection frame of the 3D first object in a to-be-detected image, the to-be-detected image being captured by an image acquisition device; obtaining the first world coordinate information based on a world coordinate system established based on the position information and the size information of the first object, the first world coordinate information including first world coordinates of the multiple landing points of the first object and first word coordinates of multiple vertices of the first object, the size information being obtained based on image characteristics of the first object; and using the coordinate conversion processing to obtain the external parameter information that converts the world coordinates of the first object into camera coordinate based on the first plane coordinates, the first world coordinates of the multiple landing points of the first object, and the internal parameter information of the image acquisition device. The external parameter information is used to obtain first camera coordinate information of the first object based on the first world coordinate information.

Another aspect of the present disclosure provides a 3D object detection device. The 3D object detection device includes a first determination module, a first acquisition module, and a second acquisition module. The first determination module is configured to determine the first plane coordinates of multiple landing points of a first object based on a projection frame of the 3D first object in a to-be-detected image. The to-be-detected image is captured by an image acquisition device. The first acquisition module is configured to obtain first world coordinate information based on a world coordinate system established based on position information and size information of the first object, the first world coordinate information including first world coordinates of the multiple landing points of the first object and first word coordinates of multiple vertices of the first object. The size information is obtained based on image characteristics of the first object. The second acquisition module is configured to use coordinate conversion processing to obtain external parameter information that converts the world coordinates of the first object into camera coordinate based on the first plane coordinates, the first world coordinates of the multiple landing points of the first object, and the internal parameter information of the image acquisition device. The external parameter information is used to obtain first camera coordinate information of the first object based on the first world coordinate information.

Another aspect of the present disclosure provides a non-transitory computer-readable storage medium containing computer-executable instructions for, when executed by one or more processors, performing a 3D object detection method. The method includes determining the first plane coordinates of multiple landing points of a first object based on a projection frame of the 3D first object in a to-be-detected image, the to-be-detected image being captured by an image acquisition device; obtaining the first world coordinate information based on a world coordinate system established based on the position information and the size information of the first object, the first world coordinate information including first world coordinates of the multiple landing points of the first object and first word coordinates of multiple vertices of the first object, the size information being obtained based on image characteristics of the first object; and using the coordinate conversion processing to obtain the external parameter information that converts the world coordinates of the first object into camera coordinate based on the first plane coordinates, the first world coordinates of the multiple landing points of the first object, and the internal parameter information of the image acquisition device. The external parameter information is used to obtain first camera coordinate information of the first object based on the first world coordinate information.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

FIG. 1C is a schematic diagram of calibrating world coordinates according to an embodiment of the present disclosure.

FIG. 2A is a flowchart of a method for detecting a height of a second object according to an embodiment of the present disclosure.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

In the present disclosure, description with reference to the terms "one embodiment," "some embodiments," "example," "specific example," or "some examples," etc., means that specific features described in connection with the embodiment or example, structure, material or feature is included in at least one embodiment or example of the present disclosure. Furthermore, the particular features, structures, materials or characteristics described may be combined in any suitable manner in any one or more embodiments or examples. Furthermore, those skilled in the art may combine the different embodiments or examples described in this specification, as well as the features of the different embodiments or examples, as long as they do not conflict with each other.

In the present disclosure, the terms "first," "second," and "third" are only used for descriptive purposes, and should not be understood as indicating or implying relative importance or implying the number of indicated technical features. Thus, a feature described with "first," "second," and "third" may expressly or implicitly include at least one of this feature, and the order may be changed according to the actual situations.

Unless otherwise defined, all technical and scientific terms used herein have the same meaning as commonly understood by those skilled in the technical field to which the present disclosure belongs. The terms used herein are only for the purpose of describing the embodiments of the present disclosure, and are not intended to limit the scope of the present disclosure.

Figure 1A:
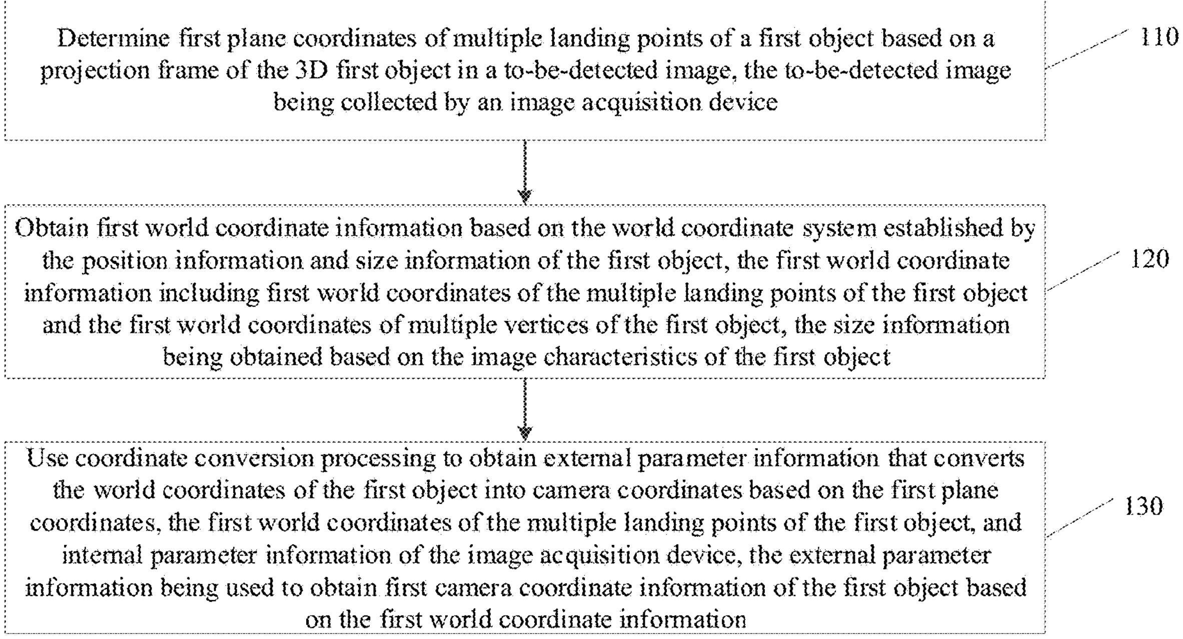
FIG. 1A is a flowchart of a 3D object detection method according to an embodiment of the present disclosure.

FIG. 1A is a flowchart of a 3D object detection method according to an embodiment of the present disclosure. The method will be described in detail below.

101, determining first plane coordinates of multiple landing points of a first object based on a projection frame of the 3D first object in a to-be-detected image, the to-be-detected image being collected by an image acquisition device.

Figure 1B:
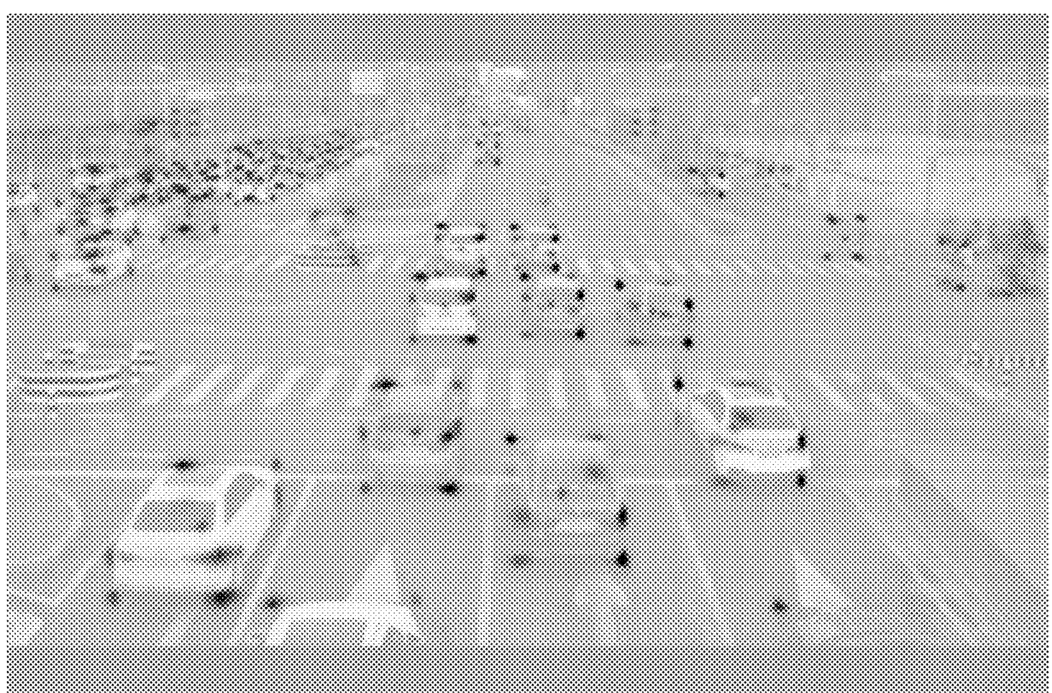
FIG. 1B is a to-be-detected image according to an embodiment of the present disclosure.

In some embodiments, the 3D first object may be a moving vehicle in the to-be-detected image. FIG. 1B is a to-be-detected image according to an embodiment of the present disclosure. As shown in FIG. 1B, the to-be-detected image includes multiple moving vehicles, that is, the first object.

Figure 2B:
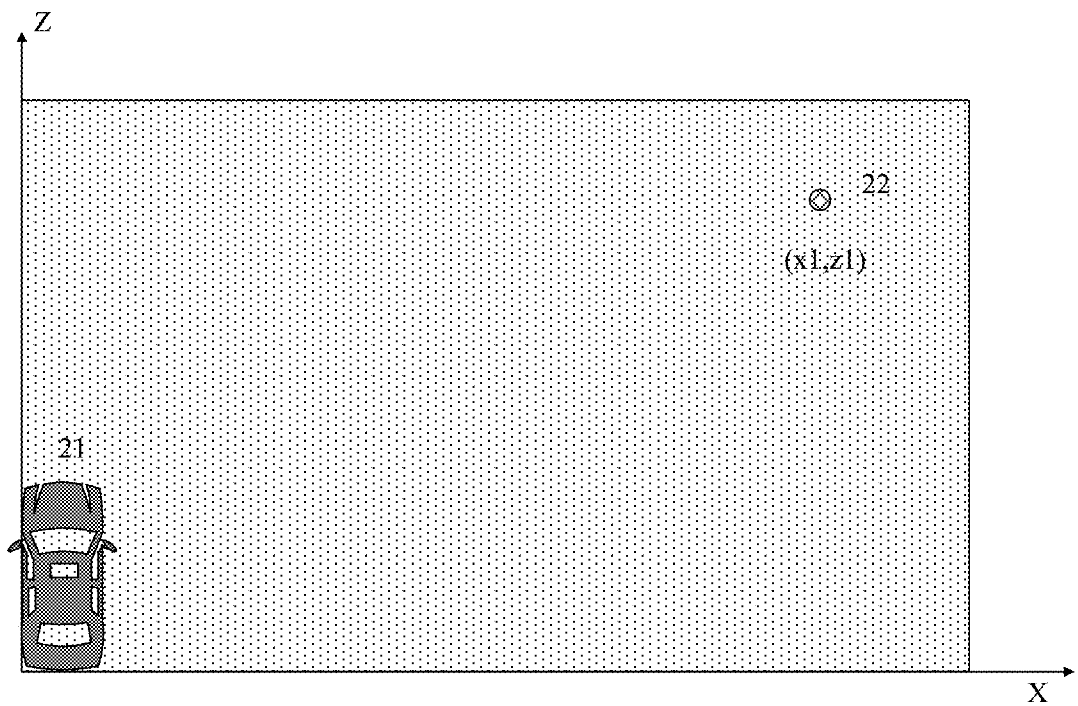
FIG. 2B is a schematic diagram of a world coordinate system including a first object and a second object according to an embodiment of the present disclosure.

During the implementation process, eight key points of the first processor and its length, width and height can be obtained based on deep learning. The eight key points may include the projection of the 3D frame of the object on the 2D image. The detection effect is shown in FIG. 2B. Here, since the length, width and height range of vehicles of know brands is less likely to fluctuate, therefore, learning based on deep network can be effective.

After obtaining the projection frame of the first object in the to-be-detected image, the first plane coordinates of the multiple landing points of the first object may be determined based on the position information of the projection frame. In some embodiments, the first plane coordinates may be pixel coordinates or image coordinates.

120, obtaining first world coordinate information based on the world coordinate system established by the position information and size information of the first object, the first world coordinate information including first world coordinates of the multiple landing points of the first object and the first world coordinates of the multiple vertices of the first object, the size information being obtained based on the image characteristics of the first object.

In some embodiments, the position information of the first object may be the landing point information of the first object. During the implementation process, a world coordinate system can be established for the first object based on the four key points of the landing points of the first object. For example, the landing point of the lower left corner of the first object can be used as the coordinate origin of the world coordinate system to establish the world coordinate system of the first object. FIG. 1C is a schematic diagram of calibrating world coordinates according to an embodiment of the present disclosure. As shown in FIG. 1C, the landing point 11 in the lower left corner of the vehicle can be used as the coordinate origin of the vehicle, that is, the coordinate value of the landing point 11 in the world coordinate system is (0, 0, 0).

In some embodiments, a deep network can be used to learn the image characteristic of the first object to obtain the size information of the first object. For example, neural networks can be used to monitor images captured by a single red green blue (RGB) imaging device to obtain the vehicle logo of some vehicles, then determine the manufacturer, model and other information of the vehicle, and obtain the vehicle size information (length, width and height) based on the manufacturer, model and other information of the vehicle.

During the implementation process, the size information of the first object may be obtained first, and then a world coordinate system may be established for the first object based on the landing points of the first object. Subsequently, the first world coordinates of the multiple landing points of the first object and the first world coordinates of the multiple vertices of the first object can be obtained in the world coordinate system of the first object. That is, the first world coordinate information can be obtained. In some embodiments, the first world coordinate information may include at least the coordinates of eight key points of the first object in the world coordinate system.

130, using coordinate conversion processing to obtain external parameter information that converts the world coordinates of the first object into camera coordinates based on the first plane coordinates, the first world coordinates of multiple landing points of the first object, and internal parameter information of the image acquisition device, the external parameter information being used to obtain first camera coordinate information of the first object based on the first world coordinate information.

In some embodiments, the internal parameter information K of the image acquisition device, that is, the internal parameter matrix, may be used to convert the coordinates in the camera coordinate system into coordinate in the pixel coordinate system. The coordinate conversion process may be a conversion process that converts coordinates in the world coordinate system into coordinates in the pixel coordinate system.

For example, take the landing point of the lower left corner of the vehicle as the coordinate origin of the vehicle, the following conversion equation (1) can be the conversion equation from the vehicle to-be-detected image system (i.e., the world coordinate system) to the camera coordinate system.

$$s[u \quad v \quad 1] = K[R \quad T][x_1 \quad y_1 \quad z_1 \quad 1]^T \tag{1}$$

where K is the internal parameter of the camera (i.e., the internal parameter information), (u, v) is the coordinate in the pixel coordinate system, $(x_1, y_1, z_1)$ is the coordinate in the world coordinate system, [R T] is the external parameter information, and s is the scaling factor.

During the implementation process, the conversion equation (1) can be used to obtain the external parameter information converted from the world coordinates of the first object to the camera coordinates, that is, the [R T] matrix.

After obtaining the [R T] matrix, since the first world coordinate information is known, the [R T] matrix can be used to obtain the first camera coordinate information of the first object. The first camera coordinate information may include at least the coordinates of eight key points of the first object in the camera coordinate system.

Consistent with the present disclosure, the first plane coordinates of multiple landing points of the first object can be determined based on the 3D projection frame of the first object in the to-be-detected image; the first world coordinate information can be obtained based on the world coordinate system established based on the position information and size information of the first object; and, a coordinate conversion processing can be used to obtain external parameter information that converts the world coordinates of the first object into camera coordinates based on the first plane coordinates, the first world coordinates of multiple landing points of the first object, and internal parameter information of the image acquisition device. The external parameter information can be used to obtain first camera coordinate information of the first object based on the first world coordinate information. Accordingly, the image characteristics of the first object can be used to obtain the size information of the first object, and the coordinate conversion process can be used to obtain the external parameter information. The external parameter information can be used to obtain the first camera coordinate information, that is, the camera coordinates of the 3D object can be obtained with high accuracy and robustness.

In some embodiments, after obtaining the first camera coordinate information of the first object, the 3D object detection method may further include a method for detecting the height of a second object. FIG. 2A is a flowchart of a method for detecting a height of a second object according to an embodiment of the present disclosure. The method will be described in detail below.

210, using the coordinate conversion processing to obtain the second world coordinates of multiple landing points of the second object in the world coordinate system of the first object based on the external parameter information, the internal parameter information and the second plane coordinates of multiple landing points of the second object in the to-be-detected image, the size information of the second object being unknown, a distance between the second object and the first object being less than a distance threshold.

In some embodiments, the second object may be an object with large changes in size, such as pedestrians, sprinklers, buses, etc., and the specific size information cannot be obtained for part of the second object.

During the implementation process, a distance threshold may be preset based on actual requirements, and the first object may be determined based on the distance threshold.

FIG. 2B is a schematic diagram of a world coordinate system including a first object and a second object according to an embodiment of the present disclosure. As shown in FIG. 2B, the diagram includes a first object 21 and a second object 22.

In some embodiments, it can be assumed that the ground within the field of view is flat, that is, the y coordinate of the landing point of all objects is 0. At this time, the ground can be regarded as a huge plane. That is, the coordinates of all object landing points can be expressed by x and z. The second world coordinate of the landing points of the second object 22 in the world coordinate system is (x1, 0, z1).

The following equation (2) can be established using the external parameter information $[R_{V2C}, T_{V2C}]$ of the first object 21 that is closer to the second object 22.

$$s[u \quad v \quad 1] = K[R_{V2C} \quad T_{V2C}][x1 \quad 0 \quad z1 \quad 1]^T \tag{2}$$

where s is the scaling factor, (u, v) is the coordinates of the second object in the pixel coordinate system, $[R_{V2C}, T_{V2C}]$ is the external parameter information of the first object, and (x1, 0, z1) the second world coordinates of the second object's landing point in the world coordinate system.

Using the second plane coordinates (u, v) in equation (2) above, two equations can be listed. There are two solvable unknowns in these two equations, such as x1 and z1 can be solved directly. That is, the second world coordinates of multiple landing points of the second object in the world coordinate system of the first object can be obtained.

220, using the coordinate conversion processing to determine the height of the second object based on the second plane coordinates of the second object vertex and the second world coordinates of the landing point, the height of the second object being used to determine the second world coordinates of multiple vertices of the second object.

During the implementation process, it is known that the landing point of the second object is the second world coordinates (x1, 0, z1) of a certain first object world coordinate system, then the second world coordinate of the corresponding vertex of the landing point in the world coordinate system is (x1, y1, z1).

Since the second pixel coordinates (u, v) of the vertex and the second world coordinates (x1, z1) in the world coordinate system are known, equation (2) can be used to determine y1, and the absolute value of y1 can be taken as the height of the second object.

In some embodiments, after obtaining the height of the second object, since the second world coordinates of multiple landing points of the second object in the world coordinate system of the first object can be determined through the process at 210, the second world coordinates of multiple vertices of the second object can be determined using the height of the second object. That is, the second world coordinate information of the second object can be obtained. In some embodiments, the second world coordinate information may include the at least the coordinates of eight key points of the second object in the world coordinate system.

Consistent with the present disclosure, the coordinate conversion processing can be used to obtain the second world coordinates of multiple landing points of the second object in the world coordinate system of the first object based on the external parameter information, the internal parameter information and the second plane coordinates of multiple landing points of the second object in the to-be-detected image. The size information of the second object is unknown, and the distance between the second object and the first object is less than a distance threshold. Further, the coordinate conversion processing can be used to determine the height of the second object based on the second plane coordinates of the second object vertex and the second world coordinates of the landing point. The height of the second object can be used to determine the second world coordinates of multiple vertices of the second object. Accordingly, the spatial position calibration can be established based on the world coordinate system of the first object, and the second world coordinates of multiple landing points of the second object in the world coordinate systems can be determined first. Subsequently, the coordinate conversion processing can be used to determine the height of the second object with high accuracy and robustness.

An embodiment of the present disclosure also provides a method for detecting the second camera coordinate information of the second object. The method will be described in detail below.

230, using the external parameter information to determine the second camera coordinate information of the second object based on the second world coordinates of multiple landing points of the second object and the height of the second object.

During the implementation process, since the second world coordinates of multiple landing points of the second object and the height of the second object are known, the second world coordinate information of the second object can be obtained.

Since the external parameter information can be used to obtain the second camera coordinate information of the second object based on the second world coordinate information, therefore, by using the external parameter information $[R_{V2C}, T_{V2C}]$ of the first object that is closer to the second object, the second camera coordinate information of the second object may be determined. In some embodiments, the second camera coordinate information may include at the coordinates of eight key points of the second object in the camera coordinate system.

Consistent with the present disclosure, the external parameter information can be used to determine the second camera coordinate information of the second object based on the second world coordinates of multiple landing points of the second object and the height of the second object. Accordingly, the second camera coordinate information of the second object in the camera coordinate system can be accurately determined.

In some embodiments, the process at 230, using the external parameter information to determine the second camera coordinate information of the second object based on the second world coordinates of multiple landing points of the second object and the height of the second object can be realized by the following processes.

231, determining the second world coordinate system information of the second object based on the second world coordinates of multiple landing points and the height of the second object.

Here, it is known that the landing point of the second object is the second world coordinate (x1, 0, z1) in the world coordinate system of a certain first object, therefore, when the height is y1, the second world coordinate of the corresponding vertex of the landing point in the world coordinate system is (x1, y1, z1).

232, using the external parameter information to determine the second camera coordinate information of the second object based on the second world coordinate system information.

The external parameter information may be used to obtain the second camera coordinate information of the second object based on the second world coordinate in formation. Using the external parameter information of $[R_{V2C}, T_{V2C}]$ of the first object that is relatively close to the second object, the second camera coordinate information of the second object can be determined.

Consistent with the present disclosure, the second world coordinate system information of the second object can be determined based on the second world coordinates of multiple landing points and the height of the second object, and the second camera coordinate information of the second object based on the second world coordinate system information by using the external parameter information. Accordingly, after obtaining the second world coordinate system information, the external parameter information can be used to accurately determine the second camera coordinate information of the second object in the camera coordinate system.

In some embodiments, the process at 220, using the coordinate conversion processing to determine the height of the second object based on the second plane coordinates of the second object vertex and the second world coordinates of the landing point can be realized by the following processes.

221, using the second world coordinates of the corresponding landing point of the second object vertex as the two plane parameters in the second world coordinates of the second object vertex.

Here, since in the world coordinate system, the (x1, z1) coordinates of the vertex of the second object corresponding to the landing point are the same as the two plane parameters of the vertex, the second world coordinates of the landing point may be used as the two plane parameters of the vertex.

222, using the coordinate conversion processing to determine the height of the second object based on the two plane coordinates of the second object vertex and the two plane parameters in the second world coordinate corresponding to the second object vertex.

Since the second pixel coordinates (u, v) and the second world coordinates (x1, z1) of the vertex are known, equation (2) can be used to determine y1, and the absolute value of y1 can be taken as the height of the second object.

Consistent with the present disclosure, the second world coordinates of the corresponding landing point of the second object vertex can be used as the two plane parameters in the second world coordinates of the second object vertex, and the coordinate conversion processing can be used to determine the height of the second object based on the two plane coordinates of the second object vertex and the two plane parameters in the second world coordinate corresponding to the second object vertex. Accordingly, the height of the second object can be obtained with higher accuracy.

Figure 3:
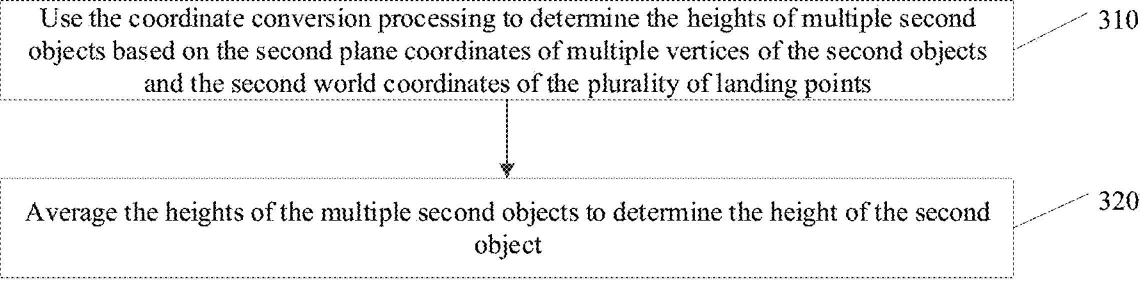
FIG. 3 is a flowchart of a method for determining the height of the second object according to an embodiment of the present disclosure.

In some embodiments, as shown in FIG. 3, the process at 220, using the coordinate conversion processing to determine the height of the second object based on the second plane coordinates of the second object vertex and the second world coordinates of the landing point can be realized by the following processes.

310, using the coordinate conversion processing to determine the heights of multiple second objects based on the second plane coordinates of multiple vertices of the second objects and the second world coordinates of the multiple landing points.

During the implementation process, an object may correspond to the second plane coordinates of multiple vertices and the second world coordinates of multiple landing points. For example, an object may include the second plane coordinates of four vertices and the second world coordinates of four landing points. Accordingly, based on the second plane coordinates of the four vertices and the second world coordinates of the four landing points, coordinate conversion processing can be used to determine the heights of the four second objects.

320, averaging the heights of multiple second objects to determine the height of the second object.

For example, the heights of four second objects may be averaged to determine the height of the second object.

Consistent with the present disclosure, the coordinate conversion processing can be used to determine the heights of multiple second objects based on the second plane coordinates of multiple vertices of the second objects and the second world coordinates of multiple landing points, and the heights of the multiple second objects can be averaged to determine the height of the second object. Accordingly, the height of the second object obtained can be more accurate.

In some embodiments, the process at 210, using the coordinate conversion processing to obtain the second world coordinates of multiple landing points of the second object in the world coordinate system of the first object based on the external parameter information, the internal parameter information and the second plane coordinates of multiple landing points of the second object in the to-be-detected image can be realized by the following processes.

211, obtaining N pieces of external parameter information corresponding to N first objects in a one-to-one relationship, N being an integer greater than 1, the distances between the second object and the N first objects all being less than the distance threshold.

Here, N first objects may be determined based on the distance threshold first, and then the external parameter information of each of the N first objects may be obtained.

212, using the coordinate conversion processing to obtain N sets of second world coordinates corresponding one-to-one to the world coordinate system of the N first objects based on each of the external parameter information, the internal parameter information, and the second plane coordinates of multiple landing points, each set of the second world coordinates including second world coordinates of multiple landing points of the second object.

During the implementation process, the external parameter information of a first object may be used to obtain the second world coordinates of a set of second objects. With N external parameter information of the first object, N sets of second world coordinates may be obtained.

Correspondingly, the process at 230, using the external parameter information to determine the second camera coordinate information of the second object based on the second world coordinates of multiple landing points of the second object and the height of the second object can be realized by the following processes.

233, using the N pieces of external parameter information to determine N sets of second camera coordinates based on the N sets of second world coordinates and the height of the second object, each set of second camera coordinates including second camera coordinates of multiple landing points and vertices.

Here, based on a set of second world coordinates and the height of the second object, using the external parameter information corresponding to the set of second world coordinates, a set of second camera coordinates may be determined. Subsequently, based on the N sets of second world coordinates and the height of the second object, using N pieces of external parameter information, N sets of second camera coordinates may be determined.

234, performing weighting processing on each second camera coordinate in the N sets of second camera coordinates to obtain processed second camera coordinate information.

During the implementation process, each second camera coordinate in the N sets of second camera coordinates may be averaged to obtain the processed second camera coordinate information. In addition, based on the distance between the first object and the second object, a weighted average of each second camera coordinate in the N sets of second camera coordinates may also be performed to obtain the processed second camera coordinate information.

Consistent with the present disclosure, based on N first objects, N sets of second camera coordinates of the second object can be obtained, and the final second camera coordinates can be the mean of the N camera coordinates. Accordingly, the obtained second camera coordinate information can be more accurate.

In some embodiments, the process at 120, obtaining first world coordinate information based on the world coordinate system established by the position information and size information of the first object can be realized by the following processes.

121, establishing the world coordinate system of the first object with a landing point of the first object as the coordinate origin.

A coordinate origin needs to be calibrated to establish a world coordinate system. During the implementation process, a landing point of the first object may be determined as the origin of the coordinates. For example, when the first object is a vehicle, the landing point of the lower left corner of the vehicle may be determined as the coordinate origin of the world coordinate system.

122, determining the first world coordinate information in the world coordinate system based on the size information of the first object.

When the size information of the first object is known, the first world coordinate information of the first object may be determined. In terms of distance, when the length, width and height of the vehicle are known, and the landing point of the lower left corner of the vehicle is determined as the coordinate origin of the world coordinate system, the first world coordinates of the vehicles eight key points may be determined.

Consistent with the present disclosure, the world coordinate system of the first object with a landing point of the first object can be established as the coordinate origin, and the first world coordinate information in the world coordinate system can be determined based on the size information of the first object. Accordingly, the first world coordinate information of the first object in the world coordinate system can be determined.

In some embodiments, the process at 130, using coordinate conversion processing to obtain external parameter information that converts the world coordinates of the first object into camera coordinates based on the first plane coordinates, the first world coordinates of multiple landing points of the first object, and internal parameter information of the image acquisition device can be realized by the following processes.

131, using the coordinate conversion processing to obtain a homography matrix of the first object based on the first world coordinates of multiple landing points of the first object and multiple first plane coordinates.

The following conversion equation (1) is the conversion equation from the vehicle coordinate system to the camera coordinate system.

$$s[u\ \ v\ \ 1]=K[R\ \ T][x_1\ \ y_1\ \ z_1\ \ 1]^T \tag{1}$$

where K is the internal parameter of the camera (i.e., the internal parameter information), (u, v) is the coordinate in the pixel coordinate system, (x1, y1, z1) is the coordinate in the world coordinate system, [R T] is the external parameter information, and s is the scaling factor.

In some embodiments, assume that the ground is flat, that is, the world coordinate of the y coordinate of the vehicle landing point is 0, then the above equation becomes the following equation.

$$[u\ \ v\ \ 1]=\frac{1}{z1}K[r1\ \ r3\ \ T][x1\ \ z1\ \ 1]^T \tag{3}$$

Accordingly, expression (4) for the homography matrix H can be obtained.

$$H=\frac{1}{z1}K[r1\ \ r3\ \ T]=\begin{bmatrix} H_{11} & H_{12} & H_{13} \\ H_{21} & H_{22} & H_{23} \\ H_{31} & H_{32} & H_{33} \end{bmatrix} \tag{4}$$

Based on equation (3) and the expression (4) of the homography matrix H, the following expression of u (5) and v (6) can be obtained.

$$u=\frac{H_{11}x1+H_{12}z1+H_{13}}{H_{31}x1+H_{32}z1+H_{33}} \tag{5}$$

$$v=\frac{H_{21}x1+H_{22}z1+H_{23}}{H_{31}x1+H_{32}z1+H_{33}} \tag{6}$$

Here, since the homography matrix H is a homogeneous matrix, there are eight independent unknowns. The length, width and height of the vehicle are known, such that the four points (x1, z1) and their corresponding (u, v) can be known such that the homography matrix H can be obtained.

132, obtaining the external parameter information based on the internal parameter information and the homography matrix.

After obtaining the homography matrix H, since the camera internal parameter k is known, the following equation (7) can be obtained.

$$[r1\ \ r3\ \ T]=K^{-1}H \tag{7}$$

Here, since r2 is perpendicular to both r1 and r3, equation (8) can be used to obtain r2.

$$r2=r1\times r3 \tag{8}$$

Accordingly, equations (7) and (8) can be used to obtain the external parameter information from the vehicle's world coordinate system to the camera coordinate system.

Consistent with the present disclosure, the coordinate conversion processing can be used to obtain a homography matrix of the first object based on the first world coordinates of multiple landing points of the first object and multiple first plane coordinates, and the external parameter information can be obtained based on the internal parameter information and the homography matrix. Accordingly, the homography matrix of the first object can be obtained first, and then the external parameter information can be obtained using the homography matrix.

Figure 4:
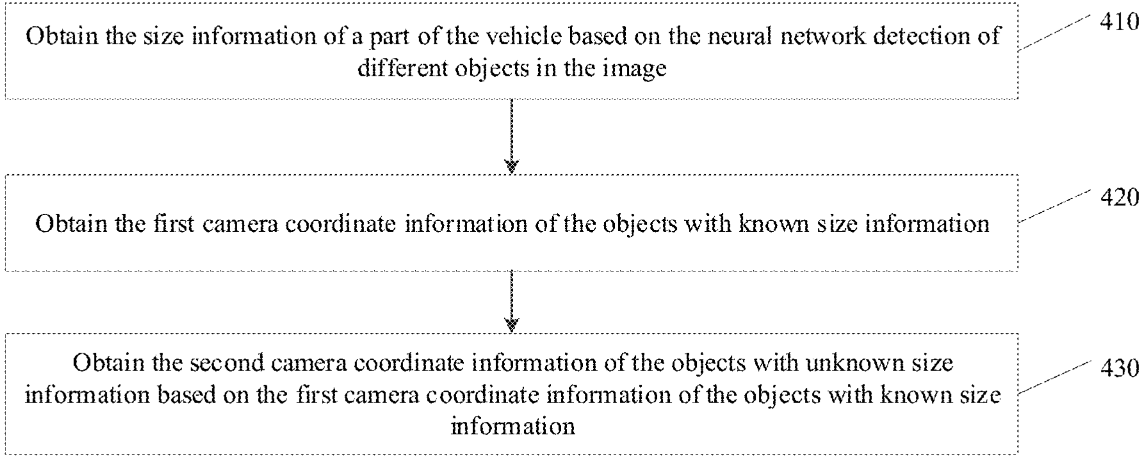
FIG. 4 is a flowchart of the 3D object detection method based on a single RGB imaging device according to an embodiment of the present disclosure.

An embodiment of the present disclosure also provides a 3D object detection method based on a single RGB imaging device. FIG. 4 is a flowchart of the 3D object detection method based on a single RGB imaging device according to an embodiment of the present disclosure. The method will be described in detail below.

410, obtaining the size information of a part of the vehicle based on the neural network detection of different objects in the image.

During the implementation process, neural networks may be used to monitor images captured by a single RGB imaging device to obtain the manufacturer, model and other information of some vehicles, and obtain the vehicle's size information (e.g., length, width and height) based on the manufacturer, model and other information. At the same time, some objects with large size changes such as pedestrians, sprinkler trucks, buses, etc., may also be detected. Specific size information cannot be obtained for these types of objects. Accordingly, the objects in the image can be divided into objects of known size and objects of unknown size. Objects of known size can be marked as O_kown and objects of unknown size can be marked as O_unkown.

420, obtaining the first camera coordinate information of the objects with known size information.

A, using the deep network to learn the object of known size information (e.g., the first object) and obtain the eight key points of the first object and its length, width and height.

In some embodiments, the eight key points may be the projection of the 3D frame of the object on the 2D image, and the detection effect is shown in FIG. 1B. Since the length, width and height range of vehicles of known brands fluctuates less, leaning based on deep networks work well.

In some embodiments, the first object may be a vehicle.

B, based on the size of the first object and the key points of the first object, obtaining the rotation and translation matrix of the current world coordinate system and camera coordinate system of the first object.

When the first object is a vehicle, a world coordinate system can be established for the vehicle based on the size of the vehicle and the key points of the vehicle, and then the external parameter information of the vehicle coordinate system and the camera coordinate system can be calculated, that is, the rotation and translation matrix [R T]. Accordingly, the 3D spatial position of the vehicle in the camera coordinate system (i.e., the first camera coordinate information) can be obtained.

During the implementation process, the internal parameter K (the internal parameter matrix) of a single RGB imaging device may be obtained based on the standard calibration process. Based on the four key points of the vehicle's landing point, a vehicle coordinate system may be established for each vehicle. For example, take the landing point of the lower left corner of the vehicle as the coordinate origin of the vehicle coordinate system, the following conversion equation (1) may be the conversion equation from the vehicle coordinate system to the camera coordinate system:

$$s[u \;\; v \;\; 1] = K[R \;\; T][x_1 \;\; y_1 \;\; z_1 \;\; 1]^T \tag{1}$$

where K is the internal parameter of the camera (i.e., the internal parameter information), (u, v) is the coordinate in the pixel coordinate system, (x1, y1, z1) is the coordinate in the world coordinate system, [R T] is the external parameter information, and s is the scaling factor.

In some embodiments, assume that the ground is flat, that is, the world coordinate of the y coordinate of the vehicle landing point is 0, then the above equation becomes the following equation.

$$[u \;\; v \;\; 1] = \frac{1}{z1}K[r1 \;\; r3 \;\; T][x1 \;\; z1 \;\; 1]^T \tag{3}$$

Accordingly, expression (4) for the homography matrix H can be obtained.

$$H = \frac{1}{z1}K[r1 \;\; r3 \;\; T] = \begin{bmatrix} H_{11} & H_{12} & H_{13} \\ H_{21} & H_{22} & H_{23} \\ H_{31} & H_{32} & H_{33} \end{bmatrix} \tag{4}$$

Based on equation (3) and the expression (4) of the homography matrix H, the following expression of u (5) and v (6) can be obtained.

$$u = \frac{H_{11}x1 + H_{12}z1 + H_{13}}{H_{31}x1 + H_{32}z1 + H_{33}} \tag{5}$$

$$v = \frac{H_{21}x1 + H_{22}z1 + H_{23}}{H_{31}x1 + H_{32}z1 + H_{33}} \tag{6}$$

After obtaining the homography matrix H, since the camera internal parameter k is known, the following equation (7) can be obtained.

$$[r1 \;\; r3 \;\; T] = K^{-1}H \tag{7}$$

Here, since r2 is perpendicular to both r1 and r3, equation (8) can be used to obtain r2.

$$r2 = r1 \times r3 \tag{8}$$

Accordingly, equations (7) and (8) can be used to obtain the external parameter information from the vehicle's world coordinate system to the camera coordinate system, where T is the coordinate of the landing point of the lower left corner of the vehicle in the camera coordinate system.

Since the world coordinate system information of the vehicle is known, the external parameter information can be used to obtain the camera coordinate system information of the vehicle.

430, obtaining the second camera coordinate information of the objects with unknown size information based on the first camera coordinate information of the objects with known size information.

In some embodiments, it can be assumed that the ground within the field of view is flat, that is, the y coordinate of the landing point of all objects is 0. At this time, the ground can be regarded as a huge plane. That is, the coordinates of all object landing points can be expressed by x and z.

When the second world coordinate of the landing point of the object of unknown size (e.g., the second object) in the world coordinate system is (x1, 0, z1) and the second pixel coordinate (u, v) corresponding to the pixel coordinate system of the image in known, the rotation and translation matric [$R_{V2C}$, $T_{V2C}$] of the object of known size (e.g., the first object) that is relatively close to the unknown object can be used to establish the following equation (2):

$$s[u \;\; v \;\; 1] = K[R_{V2C} \;\; T_{V2C}][x1 \;\; 0 \;\; z1 \;\; 1]^T \tag{2}$$

The second pixel coordinate of (u, v) in equation (8) can be used to list two equations. There are two solvable unknowns in these two equations, therefore x1 and z1 can be solved directly. That is, the second world coordinate of the second object in the world coordinate system of the first object can be obtained.

The second camera coordinate P of the second object in the camera coordinate system can be obtained using equation (9):

$$P = [R_{V2C} \;\; T_{V2C}][x1 \;\; 0 \;\; z1 \;\; 1]^T \tag{9}$$

During the implementation process, based on N first objects, n position coordinate measurement results of P1, P2, . . . . Pn of the second object can be obtained. The final second camera coordinate may be the mean of multiple coordinates. That is, equation (10) can be used to obtain the second camera coordinate P.

$$P = \text{mean}(P_1, P_2 \ldots P_n) \tag{10}$$

The second camera coordinate of the second object in the camera coordinate system obtained above may be the second camera coordinate of the landing point of the second object.

The following is the process of solving the height of the second object, that is, calculating the size of the object based on the coordinate of the second camera at the landing point.

It is known that the landing point of the second object is the second world coordinates (x1, 0, z1) of a certain first object world coordinate system, then the second world coordinate of the corresponding vertex of the landing point in the world coordinate system is (x1, y1, z1).

Since the second pixel coordinates (u, v) of the vertex and the second world coordinates (x1, z1) in the world coordinate system are known, equation (2) can be used to determine y1, and the absolute value of y1 can be taken as the height of the second object.

During the implementation process, multiple heights may be calculated based on different landing points and the selected vehicle coordinate system, and the true height of the object may be obtained by averaging.

An embodiment of the present disclosure provides a 3D object (camera coordinates) detection method based on a single RGB imaging device. The method can cover different object categories. Based on "regular" objects with prior information (such as cars of known brands, sports utility vehicles), the precise first camera coordinates of a small number of objects (e.g., the first objects) in the image can be obtained. Subsequently, the undetected objects (e.g., the second objects) can be spatially aligned with the first objects to obtain the camera coordinates of all objects. Accordingly, a small number of objects with known sizes can be used to establish spatial position calibration, and the camera coordinates of all objects can be obtained, which addresses the issue of unsolvable and low accuracy in camera coordinates detection due to insufficient information. Accordingly, coordinates of known objects can be obtained in two ways with high accuracy and robustness.

Based on the foregoing embodiments, embodiments of the present disclosure also provide a 3D object detection device. Each unit and subunit included in the device can be realized through a processor in the electronic device, and of course can be realized through a specific logic circuit. In the processes of the specific embodiments, the processor can be a central processing unit (CPU), a microprocessor unit (MPU), a digital signal processor (DSP) or a field programmable gate array (FPGA), or the like.

Figure 5:
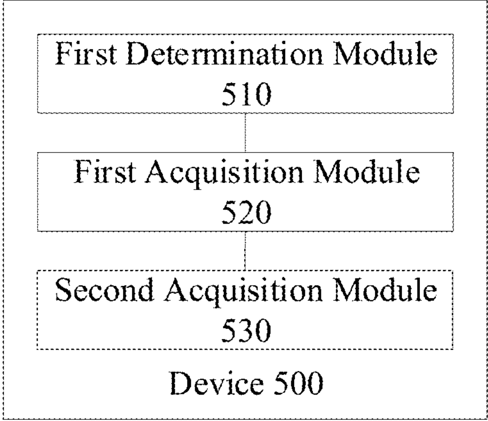
FIG. 5 is a schematic structural diagram of a 3D object detection device according to an embodiment of the present disclosure.

FIG. 5 is a schematic structural diagram of a 3D object detection device 500 according to an embodiment of the present disclosure. The 3D object detection device 500 includes a first determination module 510, a first acquisition module 520, and a second acquisition module 530.

The first determination module 510 may be configured to determine the first plane coordinates of multiple landing points of the first object based on the projection frame of the 3D first object in the to-be-detected image, the to-be-detected image being captured by an image acquisition device.

The first acquisition module 520 may be configured to obtain first world coordinate information based on the world coordinate system established by the position information and size information of the first object, the first world coordinate information including first world coordinates of multiple landing points of the first object and the first world coordinates of multiple vertices of the first object, the size information being obtained based on the image characteristics of the first object.

The second acquisition module 530 may be configured to use coordinate conversion processing to obtain external parameter information that converts the world coordinates of the first object into camera coordinates based on the first plane coordinates, the first world coordinates of multiple landing points of the first object, and internal parameter information of the image acquisition device, the external parameter information being used to obtain first camera coordinate information of the first object based on the first world coordinate information.

In some embodiments, the 3D object detection device 500 may further include a third acquisition module and a second determination module. The third acquisition module may be configured to use the coordinate conversion processing to obtain the second world coordinates of multiple landing points of the second object in the world coordinate system of the first object based on the external parameter information, the internal parameter information and the second plane coordinates of multiple landing points of the second object in the to-be-detected image, the size information of the second object being unknown, a distance between the second object and the first object being less than a distance threshold. The second determination module may be configured to use the coordinate conversion processing to determine the height of the second object based on the second plane coordinates of the second object vertex and the second world coordinates of the landing point, the height of the second object being used to determine the second world coordinates of multiple vertices of the second object.

In some embodiments, the 3D object detection device 500 may further include a third determination module. The third determination module may be configured to use the external parameter information to determine the second camera coordinate information of the second object based on the second world coordinates of multiple landing points of the second object and the height of the second object.

In some embodiments, the third determination module may include a first determination submodule and a second determination submodule. The first determination submodule may be configured to determine the second world coordinate system information of the second object based on the second world coordinates of multiple landing points and the height of the second object. The second determination submodule may be configured to use the external parameter information to determine the second camera coordinate information of the second object based on the second world coordinate system information.

In some embodiments, the second determination module may include a submodule and a third determination submodule. The submodule may be configured to determine the second world coordinate system information of the second object based on the second world coordinates of multiple landing points and the height of the second object. The third determination submodule may be configured to use the external parameter information to determine the second camera coordinate information of the second object based on the second world coordinate system information.

In some embodiments, the second determination module may include a fourth determination submodule and a fifth determination submodule. The fourth determination submodule may be configured to use the coordinate conversion processing to determine the heights of multiple second objects based on the second plane coordinates of multiple vertices of the second objects and the second world coordinates of multiple landing points. The fifth determination submodule may be configured to average the heights of multiple second objects to determine the height of the second object.

In some embodiments, the third acquisition module may include a first acquisition submodule and a second acquisition submodule. The first acquisition submodule may be configured to obtain N pieces of external parameter information corresponding to N first objects in a one-to-one relationship, N being an integer greater than 1, the distances between the second object and the N first objects all being less than the distance threshold. The second acquisition submodule may be configured to use the coordinate conversion processing to obtain N sets of second world coordinates corresponding one-to-one to the world coordinate system of the N first objects based on each of the external parameter information, the internal parameter information, and the second plane coordinates of multiple landing points, each set of the second world coordinates including second world coordinates of multiple landing points of the second object.

Correspondingly, the third determination module may include a sixth determination submodule and a weighting submodule. The sixth determination submodule may be configured to use the N pieces of external parameter information to determine N sets of second camera coordinates based on the N sets of second world coordinates and the height of the second object, each set of second camera coordinates including second camera coordinates of multiple landing points and vertices. The weighting submodule may be configured to perform weighting processing on each second camera coordinate in the N sets of second camera coordinates to obtain processed second camera coordinate information.

In some embodiments, the first acquisition module 520 may include a coordinate origin establishment submodule and a seventh determination submodule. The coordinate origin establishment submodule may be configured to establish the world coordinate system of the first object with a landing point of the first object as the coordinate origin. The seventh determination submodule may be configured to determine the first world coordinate information in the world coordinate system based on the size information of the first object.

In some embodiments, the second acquisition module 530 may include a first obtain submodule and a second obtain submodule. The first obtain submodule may be configured to use the coordinate conversion processing to obtain a homography matrix of the first object based on the first world coordinates of multiple landing points of the first object and multiple first plane coordinates. The second obtain submodule may be configured to obtain the external parameter information based on the internal parameter information and the homography matrix.

The descriptions of the above device embodiments are similar to the descriptions of the above method embodiments, and have similar beneficial effects to the method embodiments. For technical details not disclosed in the device embodiments of the present disclosure, reference may be made to the descriptions of the method embodiments of the present disclosure for understanding.

In the embodiments provided in the present disclosure, it should be understood that the disclosed system, device, and method may be implemented in other ways. For example, the device embodiments described above are only illustrative. For example, the division of the units is only a logical function division, and there may be other divisions in actual implementation. For example, multiple units or components may be combined or can be integrated into another system, or some features can be ignored or not implemented. In addition, the displayed or discussed mutual coupling or direct coupling or communication connection may be indirect coupling or communication connection through some interfaces, devices or units, and may also be electrical, mechanical or other forms of connection. The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments of the present disclosure. In addition, the functional units in the various embodiments of the present disclosure may be integrated into one processing unit, or each unit may exist alone physically, or two or more units may be integrated into one unit. The above-mentioned integrated unit can be implemented in the form of hardware or software functional unit.

When the integrated unit is implemented in the form of a software functional unit and sold or used as an independent product, it can be stored in a computer-readable storage medium. Based on this understanding, all or part of the technical solution can be embodied in the form of a software product. The computer software product is stored in a storage medium, and includes several instructions to enable a computer device (which may be a personal computer, a server, or a network device, etc.) to perform all or some of the processes of the method described in each embodiment of the present disclosure. The aforementioned storage medium includes: a flash disk, a portable hard disk, a read-only memory (ROM), a magnetic disk, an optical disk, or another medium that can store program codes.

The present disclosure also provides a computer-readable storage medium. The storage medium may be used to store a computer program. When the computer program is executed, methods provided by various embodiments of the present disclosure may be achieved.

Figure 6:
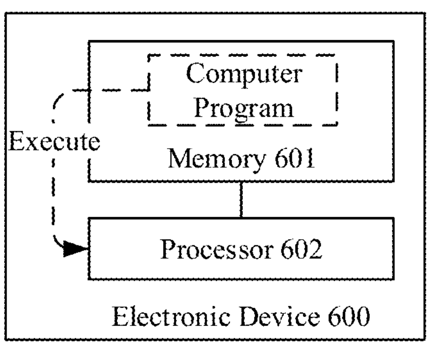
FIG. 6 is a schematic hardware diagram of an electronic device according to an embodiment of the present disclosure.

The present disclosure also provides an electronic device. FIG. 6 is a schematic hardware diagram of an electronic device according to an embodiment of the present disclosure. As shown in FIG. 6, the electronic device 600 includes a memory 601 and a processor 602. The memory 601 may be used to store a computer program, which is able to be executed by the processor. The processor 602 may execute the computer program to realize the 3D object detection methods provided by various embodiments of the present disclosure.

The memory 601 may be configured to store instructions and applications executable by the processor 602, and may also cache data to be processed or already processed by the processor 602 and data to be processed or already processed by various circuits of the electronic device 600 (for example, image data, audio data, voice communication data, or video communication data). The memory 601 may be implemented through a flash memory (FLASH) or a random-access memory (RAM).

In the present disclosure, description with reference to the terms "one embodiment," "some embodiments," "example," "specific example," or "some examples," etc., means that specific features described in connection with the embodiment or example, structure, material or feature is included in at least one embodiment or example of the present disclosure. Furthermore, the particular features, structures, materials or characteristics described may be combined in any suitable manner in any one or more embodiments or examples. Furthermore, those skilled in the art may combine the different embodiments or examples described in this specification, as well as the features of the different embodiments or examples, without conflicting each other. In various embodiments of the present disclosure, the size of the sequence numbers of the above-mentioned processes does not mean the sequence of execution, and the execution sequence of each process should be determined by its functions and internal logic, rather than the implementation process of the embodiments of the present disclosure. The above-mentioned serial numbers of the embodiments of the present application are only for description, and do not represent the advantages or disadvantages of the embodiments. The above description of the various embodiments tends to emphasize the differences between the various embodiments, and the same or similar points can be referred to each other, and for the sake of brevity, details are not repeated herein.

In the present disclosure, the terms "comprising," "including" or any other variation thereof are intended to encompass a non-exclusive inclusion such that a process, method, article or device comprising a list of elements includes not only those elements, but also others not expressly listed elements, or also include elements inherent to such a process, method, article or apparatus. Without further limitation, an element qualified by the phrase "comprising a . . . " does not preclude the presence of additional identical elements in a process, method, article or apparatus that includes the element.

In the embodiments provided in the present disclosure, it should be understood that the disclosed system, device, and method may be implemented in other ways. For example, the apparatus embodiments described above are only illustrative. For example, the division of the units is only a logical function division, and there may be other divisions in actual implementation. For example, multiple units or components may be combined or can be integrated into another system, or some features can be ignored or not implemented. In addition, the displayed or discussed mutual coupling or direct coupling or communication connection may be indirect coupling or communication connection through some interfaces, devices or units, and may also be electrical, mechanical or other forms of connection.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments of the present disclosure.

In addition, the functional units in the various embodiments of the present disclosure may be integrated into one processing unit, or each unit may exist alone physically, or two or more units may be integrated into one unit. The above-mentioned integrated unit can be implemented in the form of hardware or software functional unit.

A person of ordinary skill in the art can be aware that all or part of the processes in the method embodiments of the present disclosure can be implemented by hardware related to the program instructions. The program may be stored in a computer-readable storage medium. When the program executes, the processes of the method embodiments may be executed. The aforementioned storage medium includes: a mobile storage medium, a read-only memory (ROM), a magnetic disk, an optical disk, or another medium that can store program codes.

When the integrated unit is implemented in the form of a software functional unit and sold or used as an independent product, it can be stored in a computer-readable storage medium. Based on this understanding, all or part of the technical solution can be embodied in the form of a software product. The computer software product is stored in a storage medium, and includes several instructions to enable a computer device (which may be a personal computer, a server, or a network device, etc.) to perform all or part of the steps of the method described in each embodiment of the present disclosure. The aforementioned storage medium includes: a mobile storage medium, a read-only memory (ROM), a magnetic disk, an optical disk, or another medium that can store program codes.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A three-dimensional (3D) object detection method comprising:

determining first plane coordinates of multiple landing points of a first object based on a projection frame of the 3D first object in a to-be-detected image, the to-be-detected image being captured by an image acquisition device;

obtaining first world coordinate information based on a world coordinate system established based on position information and size information of the first object, the first world coordinate information including first world coordinates of the multiple landing points of the first object and first world coordinates of multiple vertices of the first object, the size information being obtained based on image characteristics of the first object;

using coordinate conversion processing to obtain external parameter information that converts the world coordinates of the first object into camera coordinate based on the first plane coordinates, the first world coordinates of the multiple landing points of the first object, and the internal parameter information of the image acquisition device, the external parameter information being used to obtain first camera coordinate information of the first object based on the first world coordinate information;

using the coordinate conversion processing to obtain second world coordinates of multiple landing points of a second object in the world coordinate system of the first object based on the external parameter information, the internal parameter information, and second plane coordinates of multiple landing points of the second object in the to-be-detected image; and using the coordinate conversion processing to determine a height of the second object based on the second plane coordinates of a vertex of the second object and the second world coordinates of the multiple landing points, wherein:

the size information of the second object is unknown, a distance between the second object and the first object is less than a distance threshold, and the height of the second object is used to determine the second world coordinates of multiple vertices of the second object.

2. The method of claim 1 further comprising:

using the external parameter information to determine second camera coordinate information of the second object based on the second world coordinates of the multiple landing points of the second object and the height of the second object.

3. The method of claim 2, wherein using the external parameter information to determine second camera coordinate information of the second object based on the second world coordinates of the multiple landing points of the second object and the height of the second object includes:

determining second world coordinate system information of the second object based on the second world coordinates of the multiple landing points and the height of the second object; and using the external parameter information to determine the second camera coordinate information of the second object based on the second world coordinate system information.

4. The method of claim 1, wherein using the coordinate conversion processing to determine the height of the second object based on the second plane coordinates of the vertex of the second object and the second world coordinates of the multiple landing points includes:

using the second world coordinates of the corresponding landing point of the second object vertex as two plane parameters in the second world coordinates of the second object vertex; and using the coordinate conversion processing to determine the height of the second object based on the two plane parameters in the second plane coordinate of the second object vertex and the second world coordinate corresponding to the second object vertex.

5. The method of claim 1, wherein:

the second object is one second object of multiple second objects; and using the coordinate conversion processing to determine the height of the second object based on the second plane coordinates of the vertex of the second object and the second world coordinates of the multiple landing points includes:

using the coordinate conversion processing to determine the height heights of the multiple second objects based on second plane coordinates of multiple vertices of the multiple second object objects and the second world coordinates of the multiple landing points; and averaging the heights of the multiple second objects to determine the height of the one second object.

6. The method of claim 2, wherein using the coordinate conversion processing to obtain second world coordinates of multiple landing points of the second object in the world coordinate system of the first object based on the external parameter information, the internal parameter information, and second plane coordinates of multiple landing points of the second object in the to-be-detected image include:

obtaining N pieces of external parameter information corresponding to N first objects in a one-to-one correspondence, N being an integer greater than 1, the distances between the second object and the N first objects being all being less than the distance threshold;

using the coordinate conversion processing to obtain N sets of second world coordinates that correspond one-to-one to the world coordinate systems of the second object and the N first objects, each set of the second world coordinates including the second world coordinates of the multiple landing points of the second object;

correspondingly, using the external parameter information to determine second camera coordinate information of the second object based on the second world coordinates of the multiple landing points of the second object and the height of the second object includes:

using the N pieces of external parameter information to determine N set of second camera coordinates based on the N sets of second world coordinates and the height of the second object, each set of second camera coordinates including multiple second camera coordinates of the landing points and the vertex; and performing weighting processing on each second camera coordinate in the N sets of second camera coordinates to obtain processed second camera coordinate information.

7. The method of claim 1, wherein obtaining the first world coordinate information based on the world coordinate system established based on the position information and the size information of the first object includes:

establishing the world coordinate system of the first object with a landing point of the first object as a coordinate origin; and determining the first world coordinate information in the world coordinate system based on the size information of the first object.

8. The method of claim 1, wherein using the coordinate conversion processing to obtain the external parameter information that converts the world coordinates of the first object into the camera coordinate based on the first plane coordinates, the first world coordinates of the multiple landing points of the first object, and the internal parameter information of the image acquisition device include:

using the coordinate conversion processing to obtain a homography matrix of the first object based on the first world coordinates of the multiple landing points of the first object and the multiple landing points; and obtaining the external parameter information based on the internal parameter information and the homography matrix.

9. A 3D object detection device comprising:

a first determination module, the first determination module being configured to determine first plane coordinates of multiple landing points of a first object based on a projection frame of the 3D first object in a to-be-detected image, the to-be-detected image being captured by an image acquisition device;

a first acquisition module, the first acquisition module being configured to obtain first world coordinate information based on a world coordinate system established based on position information and size information of the first object, the first world coordinate information including first world coordinates of the multiple landing points of the first object and first world coordinates of multiple vertices of the first object, the size information being obtained based on image characteristics of the first object;

a second acquisition module, the second acquisition module being configured to use coordinate conversion processing to obtain external parameter information that converts the world coordinates of the first object into camera coordinate based on the first plane coordinates, the first world coordinates of the multiple landing points of the first object, and the internal parameter information of the image acquisition device, the external parameter information being used to obtain first camera coordinate information of the first object based on the first world coordinate information;

a third acquisition module, the third acquisition module being configured to use the coordinate conversion processing to obtain second world coordinates of multiple landing points of a second object in the world coordinate system of the first object based on the external parameter information, the internal parameter information, and second plane coordinates of multiple landing points of the second object in the to-be-detected image; and a second determination module, the second determination module being configured to use the coordinate conversion processing to determine a height of the second object based on the second plane coordinates of a vertex of the second object and the second world coordinates of the multiple landing points, wherein:

the size information of the second object is unknown, a distance between the second object and the first object is less than a distance threshold, and the height of the second object is used to determine the second world coordinates of multiple vertices of the second object.

10. A non-transitory computer-readable storage medium containing computer-executable instructions for, when executed by one or more processors, performing a 3D object detection method, the method comprising:

determining first plane coordinates of multiple landing points of a first object based on a projection frame of the 3D first object in a to-be-detected image, the to-be-detected image being captured by an image acquisition device;

obtaining first world coordinate information based on a world coordinate system established based on position information and size information of the first object, the first world coordinate information including first world coordinates of the multiple landing points of the first object and first world coordinates of multiple vertices of the first object, the size information being obtained based on image characteristics of the first object;

using coordinate conversion processing to obtain external parameter information that converts the world coordinates of the first object into camera coordinate based on the first plane coordinates, the first world coordinates of the multiple landing points of the first object, and the internal parameter information of the image acquisition device, the external parameter information being used to obtain first camera coordinate information of the first object based on the first world coordinate information;

using the coordinate conversion processing to obtain second world coordinates of multiple landing points of a second object in the world coordinate system of the first object based on the external parameter information, the internal parameter information, and second plane coordinates of multiple landing points of the second object in the to-be-detected image; and using the coordinate conversion processing to determine a height of the second object based on the second plane coordinates of a vertex of the second object and the second world coordinates of the multiple landing points, wherein:

the size information of the second object is unknown, a distance between the second object and the first object is less than a distance threshold, and the height of the second object is used to determine the second world coordinates of multiple vertices of the second object.

11. The non-transitory computer-readable storage medium of claim 10, wherein the method further comprising:

using the external parameter information to determine second camera coordinate information of the second object based on the second world coordinates of the multiple landing points of the second object and the height of the second object.

12. The non-transitory computer-readable storage medium of claim 11, wherein using the external parameter information to determine second camera coordinate information of the second object based on the second world coordinates of the multiple landing points of the second object and the height of the second object includes:

determining second world coordinate system information of the second object based on the second world coordinates of the multiple landing points and the height of the second object; and using the external parameter information to determine the second camera coordinate information of the second object based on the second world coordinate system information.

13. The non-transitory computer-readable storage medium of claim 10, wherein using the coordinate conversion processing to determine the height of the second object based on the second plane coordinates of the vertex of the second object and the second world coordinates of the multiple landing points includes:

using the second world coordinates of the corresponding landing point of the second object vertex as two plane parameters in the second world coordinates of the second object vertex; and using the coordinate conversion processing to determine the height of the second object based on the two plane parameters in the second plane coordinate of the second object vertex and the second world coordinate corresponding to the second object vertex.

14. The non-transitory computer-readable storage medium of claim 10, wherein;

the second object is one second object of multiple second objects; and using the coordinate conversion processing to determine the height of the second object based on the second plane coordinates of the vertex of the second object and the second world coordinates of the multiple landing points includes:

using the coordinate conversion processing to determine the height heights of the multiple second objects based on second plane coordinates of multiple vertices of the multiple second object objects and the second world coordinates of the multiple landing points; and averaging the heights of the multiple second objects to determine the height of the one second object.

15. The non-transitory computer-readable storage medium of claim 11, wherein using the coordinate conversion processing to obtain second world coordinates of multiple landing points of the second object in the world coordinate system of the first object based on the external parameter information, the internal parameter information, and second plane coordinates of multiple landing points of the second object in the to-be-detected image include:

obtaining N pieces of external parameter information corresponding to N first objects in a one-to-one correspondence, N being an integer greater than 1, the distances between the second object and the N first objects being all being less than the distance threshold;

using the coordinate conversion processing to obtain N sets of second world coordinates that correspond one-to-one to the world coordinate systems of the second object and the N first objects, each set of the second world coordinates including the second world coordinates of the multiple landing points of the second object;

correspondingly, using the external parameter information to determine second camera coordinate information of the second object based on the second world coordinates of the multiple landing points of the second object and the height of the second object includes:

using the N pieces of external parameter information to determine N set of second camera coordinates based on the N sets of second world coordinates and the height of the second object, each set of second camera coordinates including multiple second camera coordinates of the landing points and the vertex; and performing weighting processing on each second camera coordinate in the N sets of second camera coordinates to obtain processed second camera coordinate information.

16. The non-transitory computer-readable storage medium of claim 10, wherein obtaining the first world coordinate information based on the world coordinate system established based on the position information and the size information of the first object includes:

establishing the world coordinate system of the first object with a landing point of the first object as a coordinate origin; and determining the first world coordinate information in the world coordinate system based on the size information of the first object.

17. The non-transitory computer-readable storage medium of claim 10, wherein using the coordinate conversion processing to obtain the external parameter information that converts the world coordinates of the first object into the camera coordinate based on the first plane coordinates, the first world coordinates of the multiple landing points of the first object, and the internal parameter information of the image acquisition device include:

using the coordinate conversion processing to obtain a homography matrix of the first object based on the first world coordinates of the multiple landing points of the first object and the multiple landing points; and obtaining the external parameter information based on the internal parameter information and the homography matrix.

* * * * *